United States Patent
Glass et al.

(10) Patent No.: US 12,364,269 B1
(45) Date of Patent: Jul. 22, 2025

(54) DOUGH COMPOSITIONS HAVING LITTLE TO NO NET CARBOHYDRATES FOR USE IN BAKERY PRODUCTS

(71) Applicant: Hero Labs, Inc., San Francisco, CA (US)

(72) Inventors: Coleman Beck Glass, Austin, TX (US); Jessica Rose Hillman, San Francisco, CA (US); Melanie Lynn Baron, San Francisco, CA (US); Michael Ryan Wallace, Napa, CA (US); Benjamin Thomas Roche, San Francisco, CA (US); Ivan Arturo Marquez, Napa, CA (US); Steven James Straker, Greenwood, IN (US); Robert Alan LaFleur, Gardner, KS (US)

(73) Assignee: Hero Labs, Inc., San Francisco, CA (US)

( * ) Notice: Subject to any disclaimer, the term of this patent is extended or adjusted under 35 U.S.C. 154(b) by 0 days.

(21) Appl. No.: 17/708,697

(22) Filed: Mar. 30, 2022

Related U.S. Application Data

(60) Provisional application No. 63/223,295, filed on Jul. 19, 2021, provisional application No. 63/168,134, filed on Mar. 30, 2021.

(51) Int. Cl.
*A21D 8/04* (2006.01)
*A21D 2/26* (2006.01)
*A21D 13/064* (2017.01)
*A23L 7/104* (2016.01)

(52) U.S. Cl.
CPC ............. *A21D 8/042* (2013.01); *A21D 2/265* (2013.01); *A21D 8/047* (2013.01); *A21D 13/064* (2013.01); *A23L 7/107* (2016.08)

(58) Field of Classification Search
CPC ...... A21D 2/265; A21D 8/042; A21D 13/064; A23L 7/107
See application file for complete search history.

(56) References Cited

U.S. PATENT DOCUMENTS

| | | | | |
|---|---|---|---|---|
| 2007/0098866 | A1* | 5/2007 | Waller | A21D 13/064 |
| | | | | 426/549 |
| 2010/0303991 | A1* | 12/2010 | Karwowski | A21D 6/003 |
| | | | | 426/560 |
| 2017/0265482 | A1* | 9/2017 | Holzer | A21D 2/265 |

FOREIGN PATENT DOCUMENTS

| | | | | |
|---|---|---|---|---|
| EP | 0435606 | A2 * | 3/1991 | ............... A21D 8/04 |
| EP | 2143797 | A1 * | 1/2010 | ......... C12N 15/8245 |

OTHER PUBLICATIONS

Pizzamaking.com, "Vinegar in Dough", available online as of Feb. 21, 2019. pp. 1-3. (Year: 2019).*

Machine translation of EP2143797, publication date: Jan. 13, 2010, pp. 1-33. (Year: 2010).*

Enzymes in Food and Beverage Processing, Chandrasekaran (ed.), 2016, Chapter 7, pp. 171-195.

Enzymes in Food Technology, 2nd ed., Whitehurst et al. (ed.), 2010, Chapter 6, pp. 103-143.

usda.gov [online], "FoodData Central Search Results," Nov. 1, 2017, retrieved on Dec. 19, 2022, retrieved from URL <fdc.nal.usda.gov/fdc-app.html#food-details/471565/nutrients>, 5 pages.

* cited by examiner

*Primary Examiner* — Jenna A Watts
(74) *Attorney, Agent, or Firm* — Fish & Richardson P.C.

(57) ABSTRACT

Bakery products having little or 0 net carbohydrates are described herein, as are methods of making such bakery products (e.g., dough and bread).

27 Claims, No Drawings

DOUGH COMPOSITIONS HAVING LITTLE TO NO NET CARBOHYDRATES FOR USE IN BAKERY PRODUCTS

CROSS REFERENCE TO RELATED APPLICATIONS

This application claims the benefit of priority under 35 U.S.C. § 119 (e) to U.S. Application No. 63/168,134 filed on Mar. 30, 2021 and U.S. Application No. 63/223,295 filed on Jul. 19, 2021.

TECHNICAL FIELD

This disclosure generally relates to dough compositions having little to no net carbohydrates for use in bakery products (e.g., breads and buns).

BACKGROUND

Current doughs and the resulting bakery products (e.g., breads and buns) produced therefrom can have a net carbohydrate content, for example, of about 23 grams (per 46 gram serving; see, for example, fdc.nal.usda.gov/fdc-app.html #/food-details/471565/nutrients on the World Wide Web). Dough and bread having reduced net carbohydrates can be made, but typically result in less than desirable texture, mouth feel, density, and/or crumb. Therefore, a low- to no-net carbohydrate dough and the resulting bakery products produced therefrom having desirable physical and nutritional features is desirable.

SUMMARY

Dough and bakery products having little to no net carbohydrates, and methods of making dough and bakery products having little to no net carbohydrates, are described herein.

In one aspect, a low or 0 net carbohydrate dry blend for use in a low or 0 net carbohydrate dough composition is provided. Such a dry blend typically includes a) a flour component, where the flour component comprises resistant starch and gluten; and b) at least one enzyme component.

In some embodiments, the resistant starch is present in an amount of about 30% to about 75% by weight of the dry blend (e.g., about 35% to about 70% by weight of the dry blend; about 40% to about 65% by weight of the dry blend; about 45% to about 60% by weight of the dry blend). In some embodiments, the resistant starch is resistant starch wheat flour.

In some embodiments, the gluten is a high protein gluten (e.g., greater than 90% gluten). In some embodiments, the gluten is present in an amount of about 15% to about 45% by weight of the dry blend (e.g., amount of about 20% to about 35% by weight of the dry blend; amount of about 25% to about 30% by weight of the dry blend; amount of about 26.5% to about 27% by weight of the dry blend).

In some embodiments, the at least one enzyme component comprises at least one enzyme. In some embodiments, the at least one enzyme component comprises a plurality of enzymes. In some embodiments, the at least one enzyme component is present in an amount of about 1.1% to about 12% by weight of the dry blend (e.g., about 1.5% to about 10% by weight of the dry blend; about 2.0% to about 8.0% by weight of the dry blend; about 3.0% to about 5.0% by weight of the dry blend).

In some embodiments, the at least one enzyme component comprises at least one amylase. In some embodiments, the at least one enzyme component comprises at least one protease. In some embodiments, the at least one enzyme component comprises at least one lipase. In some embodiments, the at least one enzyme component comprises at least one maltase and/or invertase. In some embodiments, the at least one enzyme component comprises at least one asparaginase. In some embodiments, the at least one enzyme component comprises at least one xylanase and/or pentosanase and/or hemicellulase. In some embodiments, the at least one enzyme component comprises at least one glucose oxidase. In some embodiments, the at least one enzyme component comprises at least one hexose oxidase. In some embodiments, the at least one enzyme component comprises at least one lipoxygenase. In some embodiments, the at least one enzyme component comprises at least one transglutaminase. In some embodiments, the at least one enzyme component comprises at least one starch modifying enzyme. In some embodiments, the at least one enzyme component comprises at least one dough conditioner. In some embodiments, the at least one enzyme component comprises at least one freshness enzyme.

In some embodiments, the low or 0 net carbohydrate dry blend further includes fiber. In some embodiments, the fiber is present in an amount of about 4.0% to about 25% by weight of the dry blend (e.g., about 5.0% to about 20% by weight of the dry blend; about 10% to about 15% by weight of the dry blend). In some embodiments, the fiber is *psyllium* (e.g., *psyllium* husk), sugarcane, wheat, bamboo, flaxseed, oat, or combinations thereof.

In some embodiments, the low or 0 net carbohydrate dry blend further includes further includes at least one non-gluten protein. In some embodiments, the at least one non-gluten protein is present in an amount of about 2.0% to about 7.0% by weight of the dry blend (e.g., about 3.0% to about 6.0% by weight of the dry blend; about 4.0% to about 6.0% by weight of the dry blend). In some embodiments, the at least one non-gluten protein is wheat protein, canola protein, pea protein, fava protein, or combinations thereof.

In some embodiments, the low or 0 net carbohydrate dry blend further includes protein isolate. In some embodiments, the low or 0 net carbohydrate dry blend further includes the protein isolate is present in an amount of about 2.6% to about 25% by weight of the dry blend (e.g., about 5.0% to about 20% by weight of the dry blend; about 10% to about 15% by weight of the dry blend). In some embodiments, the protein isolate is fava bean protein isolate, pea protein isolate, mung bean protein isolate, or combinations thereof.

In some embodiments, the low or 0 net carbohydrate dry blend further includes a hydrocolloid. In some embodiments, the hydrocolloid is present in an amount of about 1.0% to about 3.0%, by weight of the dry blend (e.g., about 1.25% to about 2.5%, by weight of the dry blend; about 1.5% to about 2.25%, by weight of the dry blend; about 1.75% to about 2.0%, by weight of the dry blend). In some embodiments, the hydrocolloid is guar, flax (e.g., milled flax), or a combination thereof. In some embodiments, the hydrocolloid comprises at least one gum. Representative gums include, without limitation, xanthan gum, guar gum, or a combination thereof.

In another aspect, a low or 0 net carbohydrate dough composition is provided. Such a dough composition typically includes i) the low or 0 net carbohydrate dry blend of any of the preceding claims; ii) at least one liquid ingredient; iii) salt; and iv) yeast.

In some embodiments, the low or 0 net carbohydrate dry blend is present in an amount of about 25% to about 75% by weight of the dough composition (e.g., about 30% to about 70% by weight of the dough composition; about 40% to about 60% by weight of the dough composition; about 45% to about 55% by weight of the dough composition).

In some embodiments, the at least one liquid ingredient comprises water. In some embodiments, the water is present in an amount of about 39% to about 44% by weight of the dough composition (e.g., about 40% to about 43% by weight of the dough composition; about 41% to about 42% by weight of the dough composition).

In some embodiments, the at least one liquid ingredient comprises oil. In some embodiments, the oil is present in an amount of about 2.0% to about 8.0%, by weight of the dough composition (e.g., about 2.5% to about 7.5%, by weight of the dough composition; about 3.0% to about 4.0%, by weight of the dough composition). In some embodiments, the oil is canola oil, soybean oil, olive oil, safflower oil, vegetable oil or combinations thereof.

In some embodiments, the at least one liquid ingredient comprises vinegar. In some embodiments, the vinegar is present in an amount of about 0.5% to about 3.0% by weight of the dough composition (e.g., about 0.75% to about 2.5% by weight of the dough composition; about 1.0% to about 2.0% by weight of the dough composition). In some embodiments, the vinegar is white vinegar (e.g., white distilled vinegar) or apple cider vinegar.

In some embodiments, the salt is present in an amount of about 0.5% to about 2.5%, by weight of the dough composition (e.g., about 1.0% to about 2.0%, by weight of the dough composition).

In some embodiments, the yeast is present in an amount of about 0.7% to about 5.5% by weight of the dough composition (e.g., about 1.5% to about 4.5% by weight of the dough composition; about 2.5% to about 3.5% by weight of the dough composition).

In some embodiments, the yeast is *Saccharomyces cerevisiae*.

Unless otherwise defined, all technical and scientific terms used herein have the same meaning as commonly understood by one of ordinary skill in the art to which the methods and compositions of matter belong. Although methods and materials similar or equivalent to those described herein can be used in the practice or testing of the methods and compositions of matter, suitable methods and materials are described below. In addition, the materials, methods, and examples are illustrative only and not intended to be limiting. All publications, patent applications, patents, and other references mentioned herein are incorporated by reference in their entirety.

DETAILED DESCRIPTION

Bakery products (e.g., bread loaves, buns) having little to no net carbohydrates are described. As described herein, a low to no net carbohydrate dry blend is produced, to which one or more ingredients are combined to produce the bread. The low to no net carbohydrate bread described herein typically contains 2 g net carbs or less (per 46 g serving) while retaining the desirable features (e.g., texture, density, mouthfeel, crumb) of the bakery product. As used herein, "total carbohydrates" refers to the amount of carbohydrates, fiber (soluble and insoluble) and sugar alcohols, while "net carbohydrates" refers to the amount of total carbohydrates minus fiber and sugar alcohols that are present.

With respect to the ingredients used in a little to 0 net carbohydrate bakery product as described herein, it should be noted that the percentages referred to herein (e.g., by weight of the dry blend, by weight of the dough composition) are, unless noted otherwise, true (or conventional) percentages, in which the combined ingredients total 100%. This is in contrast to the commonly used baker's percentages, in which the weight of the flour is always 100%, and the percent of each of the other ingredients is relative to the flour.

Low or 0 (Zero) Net Carbohydrate Dry Ingredients

As described herein, a low or 0 net carbohydrate dry blend for use in a low or 0 net carbohydrate dough composition typically includes at least a flour component; yeast; and water. As part of the low to 0 net carbohydrate feature as described herein, the flour component typically includes a resistant starch flour and gluten.

Flour Component

Resistant starches are known in the art and are so named because of their resistance to degradation in the small intestine of individuals. Resistant starch flours can be naturally produced within the plant used as the source of the flour and/or resistant starch can be exogenously added from the same or a different plant source (e.g., raw plant sources) and/or from a synthetic source. Resistant starch can be considered a dietary fiber when it occurs naturally or a functional fiber when it is added.

Resistant starch is categorized into four types. RS1 is resistant starch that is physically inaccessible or undigestible resistant starch (e.g., starch found in seeds or legumes and unprocessed whole grains). RS2 is resistant starch that is inaccessible to enzymes due to conformation of the starch (e.g., starch found in green bananas and high amylose corn starch). RS3 is resistant starch that is formed when starch-containing foods are cooked and cooled (e.g., starch in pasta), and occurs due to retrogradation (i.e., the collective processes of dissolved starch becoming less soluble after being heated and dissolved in water and then cooled). Lastly, RS4 is starch that has been chemically modified to resist digestion.

As described herein, the resistant starch flour can be present in the dry blend in an amount of about 30% to about 75% by weight of the dry blend (e.g., about 35% to about 70% by weight of the dry blend, about 40% to about 65% by weight of the dry blend, or about 45% to about 60% by weight of the dry blend). Resistant starch flours from wheat, corn, potato, rice, banana, and oat can be used in the low or 0 net carbohydrate dry blend described herein.

Gluten is known in the art and refers to a group of seed storage proteins from wheat and other cereals such as barley, rye, and oat. Gluten proteins typically are used as a source of protein in bakery products. A skilled artisan would appreciate that gluten proteins sometimes are referred to as "functional" proteins, to reflect their important role in bakery products (e.g., by producing a protein network that helps trap gases produced during fermentation, which ultimately allows the dough to rise). High protein gluten (or "refined" gluten) as used herein typically is defined as gluten that contains at least 90% gluten protein content. In the context of a low or 0 net carbohydrate bakery product, the source of the gluten protein is less important than how refined the gluten protein is. As described herein, a high protein gluten can be present in the dry blend in an amount of about 15% to about 45% by weight of the dry blend (e.g., about 20% to about 35% by weight of the dry blend, about 25% to about 30% by weight of the dry blend, or about 26.5% to about 27% by weight of the dry blend).

Enzymes

In addition to the resistant starch and the gluten, one or more enzymes can be included in the blend. Enzymes used in the bakery industry typically fall within the Generally Recognized as Safe (GRAS) food additives.

Depending on the type of bakery product and the features desired, the enzyme component can include, without limitation, one or more hydrolases, one or more oxidoreductase, and one or more transferase. For example, a bakery product can include at least one amylase; at least one protease; at least one lipase; at least one maltase and/or invertase; at least one asparaginase; at least one xylanase and/or pentosanase and/or hemicellulase; at least one glucose oxidase; at least one hexose oxidase; at least one lipoxygenase; at least one transglutaminase, or combinations thereof. In addition, a bakery product can include one or more enzymes (e.g., a blend of enzymes) that are described functionally (e.g., starch modifier; freshness; modifiers of dough handling properties (e.g., dough conditioners; dough strengtheners); mix reducers; fermentation aides or enhancers; crumb softeners; anti-staling agents).

Table 1 describes categories of enzymes that are often used in bakery products and their associated functionality. See, for example, Mathewson (*Enzymes,* 2nd edition, Eagan Press Handbook Series, AACC International, Inc., 1998, pp. 1-105); Van Oort (*Enzymes in Food Technology,* 2nd Ed, Blackwell Publishing Ltd, 2010, pp. 103-143); Rosell and Dura (*Enzymes in Food and Beverage Processing*, CRC Press, Taylor & Francis Group, L L C, 2016, pp. 171-195) for additional descriptions of enzymes used in bakery products.

TABLE 1

Enzymes associated with bakery products

| IUPAC/IUB classification | Type | Chemical bond cleaved-Reaction catalysis/hydrolysis | Specific function |
| --- | --- | --- | --- |
| Hydrolases | Protease | Protein-peptide bond | Reduces mixing time<br>Modifies dough handling properties<br>Improves pan flow<br>Improves dough machinability<br>Redistributes water in dough |
| | Lipase | Fats-Ester (alcohol-fatty acid) bond | Produces emulsifiers from fats<br>Stabilizes gas cells in batter and dough<br>Improves batter aeration<br>Softens crumb, helping fight staling |
| | Amylases | Starch-glycosidic bond | Improves fermentation<br>Produces maltose and glucose from starch (yeast food)<br>Anti-staling agents |
| | Cellulase | Cellulose-glycosidic bond | Redistributes water in dough |
| | Xylanase/Pentosanase/Hemicellulase | Arabinoxylans-glycosidic bond | Improves gluten matrix cohesiveness and gas retention<br>Modifies dough consistency and handling properties |
| | Maltase, invertase | Disaccharides, maltose and sucrose-glycosidic bond | Improves fermentation<br>Produces monosaccharides (yeast food)<br>Improves crust color, through browning reactions |
| | Asparaginase | Proteins-amide (carbon-nitrogen) bond | Reduces acrylamide in thermally processed foods |
| Oxidoreductases | Glucose oxidase | Glucose-oxidation into gluconic acid and hydrogen peroxide | Strengthens dough<br>Aggregates gluten-forming proteins, through the oxidation of sulfhydryl (—SH) groups to disulphide (S—S) bond<br>Improves mixing tolerance<br>Enhances dough gas retention capacity |
| | Hexose oxidase | Oxidation of hexose sugars (less specific) by atmospheric oxygen into gluconic acid and hydrogen peroxide | |

TABLE 1-continued

Enzymes associated with bakery products

| IUPAC/IUB classification | Type | Chemical bond cleaved-Reaction catalysis/hydrolysis | Specific function |
|---|---|---|---|
| | Lipoxygenase | Fatty acids-oxidation to produce peroxides | Similar functionality to that of glucose/hexose oxidase Bleaching effect (destruction of flour carotenoid pigments) |
| Transferases | Transglutaminase | Acyl-transfer reaction between carboxamide group of peptide-bound glutamine residues and a variety of primary amines | Similar functionality to glucose/hexose oxidase although using different mechanism (introduction of covalent cross-links between glutamine and lysine) |

An enzyme component can be present in the blend in an amount of about 1.1% to about 12% by weight of the dry blend (e.g., about 1.5% to about 10% by weight of the dry blend, about 2.0% to about 8.0% by weight of the dry blend, about 3.0% to about 5.0% by weight of the dry blend). As used herein an "enzyme component" can include one enzyme or enzyme mixture or more than one enzyme or enzyme mixtures (e.g., two, three, four, five, six or more enzymes or enzyme mixtures). Enzymes or enzyme mixtures as described herein can be obtained from any number of suppliers such as, for example, Lallemand, Cain Food, or Puratos.

Additional Ingredients

Bakery products can include any number of additional ingredients, including fiber, one or more protein compositions (e.g., proteins, protein isolates), and/or one or more additional components (e.g., hydrocolloids, gums, conditioners). The ingredients described below are intended to be representative, since a number of different ingredients used in bakery products can provide the same or a similar functionality.

Fiber is a typical ingredient used in a bakery product, including a low or 0 net carbohydrate dry blend for use in a low or 0 net carbohydrate dough composition. Fiber can be used to retain moisture in doughs and breads and prevent crumble, and a bulking agent to build structure. In one embodiment, fiber can be present in the blend in an amount of about 4.0% to about 25% by weight of the dry blend (e.g., about 5.0% to about 20% by weight of the dry blend, about 10% to about 15% by weight of the dry blend). Representative sources of fiber include, without limitation, *psyllium* (e.g., *psyllium* husk), sugarcane, wheat, bamboo, flaxseed, oat, or combinations thereof.

A low or 0 net carbohydrate dry blend for use in a low or 0 net carbohydrate dough composition as described herein can include one or more non-gluten proteins. A skilled artisan would appreciate that these non-gluten proteins sometimes are referred to as "non-functional" proteins, simply to distinguish them from the gluten proteins. Non-gluten proteins can be used to provide bulk in dough and bakery products. One or more non-gluten proteins can be present in the dry blend in an amount of about 2.0% to about 7.0% by weight of the dry blend (e.g., about 3.0% to about 6.0% by weight of the dry blend, about 4.0% to about 5.0% by weight of the dry blend). Representative non-gluten proteins that can be used in a dry blend as described herein include, without limitation, non-gluten wheat proteins, (non-gluten) canola proteins, (non-gluten) pea proteins, fava proteins, or combinations thereof.

A low or 0 net carbohydrate dry blend for use in a low or 0 net carbohydrate dough composition as described herein can include one or more (non-gluten) protein isolates. Protein isolates can be purified or isolated to varying degrees. In some instances, it may be useful to include a highly purified protein (e.g., greater than 80% purified, greater than 90% purified, e.g., greater than 95% purified) in a low or 0 net carbohydrate dry blend as described herein. Protein isolates can be used, for example, to control viscosity and binding in dough and bakery products. One or more protein isolates can be present in a dry blend as described herein in an amount of about 2.6% to about 25% by weight of the dry blend (e.g., about 5.0% to about 20% by weight of the dry blend, about 10% to about 15% by weight of the dry blend). Representative protein isolates that can be used in a dry blend as described herein include, without limitation, fava bean protein isolate, pea protein isolate, mung bean protein isolate, or combinations thereof.

A low or 0 net carbohydrate dry blend for use in a low or 0 net carbohydrate dough composition as described herein also can include one or more hydrocolloids. Hydrocolloids can be used to modify or control the viscosity and/or texture of a dough and to increase the shelf life of the resultant bakery product. A hydrocolloid can be present in the blend in an amount of about 1.0% to about 3.0% by weight of the dry blend (e.g., about 1.25% to about 2.5% by weight of the dry blend, about 1.5% to about 2.25% by weight of the dry blend, about 1.75% to about 2.0% by weight of the dry blend). Representative hydrocolloids that are suitable for use in a bread dough includes, without limitation, guar, xanthan, flax (e.g., milled flax), or a combination thereof. Hydrocolloids can impart a variety of functional attributes to bakery products; for example, one class of hydrocolloids, gums, can serve as thickeners, emulsifiers, structure builders and/or stabilizers in doughs and breads. A skilled artisan would appreciate that some hydrocolloids (e.g., xanthan gum) can act as functional carbohydrates. While such ingredients are not prohibited from being used in the bread and bakery products described herein, a skilled artisan would understand that it would be desirable to use ingredients that do not add a significant amount of carbohydrates, or to use such ingredients sparingly to still achieve the desired amount of net carbohydrates.

In addition, a low or 0 net carbohydrate dry blend for use in a low or 0 net carbohydrate dough composition as described herein also can include any number of additional ingredients such as, without limitation, nutrients, minerals, oxidants, reductants, and/or emulsifiers. Such additional ingredients can be used, for example, to improve the baking functionality of a dough, decrease the rising time of the dough, and/or improve the strength or workability of the dough.

Low or 0 (Zero) Net Carbohydrate Dough Composition

A low or 0 net carbohydrate dry blend as described herein can be used to create a low or 0 net carbohydrate dough composition. Typically, one or more liquid ingredients is added to the low or 0 net carbohydrate dry blend in order to produce a low or 0 net carbohydrate dough composition. In addition, a low or 0 net carbohydrate dry blend typically includes salt and yeast. As described herein, the low or 0 net carbohydrate dry blend can be present in a dough composition in an amount of about 25% to about 75% by weight of the dough composition (e.g., about 30% to about 70% by weight of the dough composition, about 40% to about 60% by weight of the dough composition, about 45% to about 55% by weight of the dough composition).

Water is one of the liquid ingredients typically used in dough compositions. The water used in a dough composition as described herein can be municipal tap water or water that has been purified, and typically is used at a temperature between about 55° F. and about 65° F. Water can be present in the a low or 0 net carbohydrate dough composition in an amount of about 39% to about 44% by weight of the dough composition (e.g., about 40% to about 43% by weight of the dough composition, about 41% to about 42% by weight of the dough composition).

A low or 0 net carbohydrate dough composition also can include an oil. Oil can act as a tenderizer in the baked product and helps crisp the crust during baking. An oil can be present in a low or 0 net carbohydrate dough composition in an amount of about 2.0% to about 8.0% by weight of a low or 0 net carbohydrate dough composition (e.g., about 2.5% to about 5% by weight of a low or 0 net carbohydrate dough composition; about 3% to about 4% by weight of a low or 0 net carbohydrate dough composition; about 4% to about 6% by weight of a low or 0 net carbohydrate dough composition; about 5% to about 7% by weight of a low or 0 net carbohydrate dough composition; about 3% to about 6% by weight of a low or 0 net carbohydrate dough composition; about 4% to about 5% by weight of a low or 0 net carbohydrate dough composition; about 6.5% to about 7.5% by weight of a low or 0 net carbohydrate dough composition; about 6.8% to about 7.2% by weight of a low or 0 net carbohydrate dough composition). Representative oils include, without limitation, canola oil, soybean oil, olive oil, safflower oil, vegetable oil, and combinations thereof.

In addition, a low or 0 net carbohydrate dough composition further can include a vinegar. In bakery products, vinegar can help with, for example, dough extensibility, pH balance and yeast activation. Vinegar can be present in a low or 0 net carbohydrate dough composition in an amount of about 0.5% to about 3.0% by weight of the dough composition (e.g., about 0.75% to about 2.5% by weight of the dough composition, about 1.0% to about 2.0% by weight of the dough composition). Representative vinegars include, without limitation, white vinegar (e.g., white distilled vinegar) or apple cider vinegar.

Yeast used in bakery products, typically referred to as baker's yeast, is known in the art and typically includes *Saccharomyces cerevisiae*. As described herein, yeast can be present in a low or 0 net carbohydrate dough composition in an amount of about 0.7% to about 5.5% by weight of the dough composition (e.g., about 1.0% to about 5.0% by weight of the dough composition; about 1.5% to about 4.5% by weight of the dough composition; about 2.0% to about 4.0% by weight of the dough composition; about 2.5% to about 3.5% by weight of the dough composition). Instant yeast (also known as fast-rising yeast), cake yeast (also known as wet, fresh, or compressed yeast), active dry yeast, deactivated yeast, or a combination thereof can be used in a dough composition as described herein.

As described herein, a low or 0 net carbohydrate dough composition typically also includes salt. The salt can be present in a low or 0 net carbohydrate dough composition in an amount of about 0.5% to about 2.5% by weight of the dough composition (e.g., about 0.75% to about 2.0% by weight of the dough composition; about 1.0% to about 1.5% by weight of the dough composition).

Methods of Making a Low or 0 Net Carbohydrate Dough and Bakery Products

Typically, the dry ingredients of the low or 0 net carbohydrate dry blend are mixed together to uniformity. After mixing the dry ingredients, the liquid ingredients as well as yeast and salt then are added to form a low or 0 net carbohydrate dough composition. Mixing the ingredients of a low to 0 net carbohydrate bakery product can be done by hand or using any number of mechanical mixers (e.g., industrial mixers).

Once a low to 0 net carbohydrate dough composition has been produced, it is typically proofed and then baked. Proofing refers to the step in which the yeast is activated; proofing can refer to any stage of fermentation, but typically refers to the final rise. Typically, dough is portioned appropriately (e.g., sized for bun or loaf formation) and formed into the desired shape (e.g., buns, rolls, loaves, etc,) prior to proofing, but dough can be portioned and/or shaped after proofing. Representative proofing conditions include 60-120 mins at 90-105° F., but can vary depending on the type of bakery product and the yeast, for example.

After proofing, bakery products are then baked. Representative baking conditions include baking at about 325° F. to about 425° F. for a time ranging from about 10 minutes up to about 45 minutes, depending upon the bakery product and the desired color and/or crispness.

Low or 0 Net Carbohydrate Dough and Bakery Products Produced Therefrom

Low or 0 net carbohydrate dough as described herein has the texture and structure of regular bread dough and forms a gluten structure that pulls a gluten "windowpane," even in the absence of carbohydrates.

A low or 0 net carbohydrate bread as described herein can take any number of forms, including, without limitation, loaves, buns, rolls, and enriched breads.

One or more of the ingredients described herein may be allergenic (e.g., wheat, gluten). Similar low or 0 net carbohydrate doughs, however, can be generated in the absence of one or more allergens.

A low or 0 net carbohydrate bread as described herein typically is 2 g net carbs or less (e.g., 1 g net carb, 0 g net carbs). The low or 0 net carbohydrate bakery products as described herein a gluten structure and crumb network that bakes and pulls apart similar to a conventional bread (e.g., a bread having about 24 g net carbohydrates per 46 gram serving).

In accordance with the present invention, there may be employed conventional molecular biology, microbiology, biochemical, and recombinant DNA techniques within the skill of the art. Such techniques are explained fully in the literature. The invention will be further described in the following examples, which do not limit the scope of the methods and compositions of matter described in the claims.

EXAMPLES

Example 1—Dough Compositions Having Little or 0 Net Carbohydrates for Use in Breads or Buns The ingredient list for the "0 Net Carb Dry Blend" as described herein is shown in Table 2. The 0 Net Carb Dry Blend described herein is combined with yeast, salt and liquid ingredients (e.g., water, oil, and vinegar) as shown in Table 3 to produce the "0 Net Carb Dough" described herein.

TABLE 2

Formulation of Low to 0 Net Carb Dry Blend

| Ingredient | Range (%) |
| --- | --- |
| Resistant wheat starch | 32.0-64.0 |
| High protein gluten | 20.5-33.6 |
| Wheat protein | 5.1-6.2 |
| Ground flaxseed | 4.4-6.0 |
| Guar gum | 1.5-3.0 |
| Fava bean protein isolate | 2.6-3.5 |
| Enzyme(s) (e.g., Essential Soft 1910) | 0.1-0.5 |
| Enzyme(s) (e.g., Essential FSA 2013) | 0.5-1.0 |
| Enzyme(s) (Essential CL 1302) | 0.5-1.5 |

TABLE 3

Formulation of Low to 0 Net Carb Dough

| Ingredient | Range (%) |
| --- | --- |
| Resistant wheat starch | 14.9-32.3 |
| High protein gluten | 10.0-15.5 |
| Wheat protein | 2.0-3.0 |
| Ground flaxseed | 2.0-3.0 |
| Guar gum | 0.5-1.5 |
| Fava bean protein isolate | 1.0-2.0 |
| Enzyme(s) (e.g., Essential Soft 1910) | 0.1-0.2 |
| Enzyme(s) (e.g., Essential FSA 2013) | 0-0.5 |
| Enzyme(s) (Essential CL 1302) | 0-0.5 |
| Salt | 0.5-1.0 |
| Water | 39.0-44.0 |
| Oil | 2.0-8.0 |
| Vinegar | 1.0-3.0 |
| Yeast | 0.7-5.5 |

Dry ingredients were blended together, then mixed with water (at a temperature of about 60° F.), yeast, oil and vinegar to form a dough. The dough was then mixed, portioned (e.g., an 80 g bun, a 200 g loaf), formed into the desired shape (e.g., buns, rolls, loaves, etc,), proofed (e.g., 60-120 mins at 90-105° F.) and then baked (e.g., about 400° F. for about 15-20 mins).

It is to be understood that, while the methods and compositions of matter have been described herein in conjunction with a number of different aspects, the foregoing description of the various aspects is intended to illustrate and not limit the scope of the methods and compositions of matter. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed.

What is claimed is:

1. A low or 0 net carbohydrate dry blend for use in a low or 0 net carbohydrate dough composition, comprising:
   a) resistant starch and gluten, wherein the resistant starch is present in an amount of about 45% to about 60% by weight of the dry blend, wherein the gluten is a high protein gluten comprising greater than 90% gluten protein and is present in an amount of about 20% to about 35% by weight of the dry blend; and
   b) at least one enzyme component,
   wherein low net carbohydrate refers to 2 g net carbohydrates or less per 46 g serving.

2. The low or 0 net carbohydrate dry blend of claim 1, wherein the resistant starch is resistant wheat starch.

3. The low or 0 net carbohydrate dry blend of claim 1, wherein the at least one enzyme component comprises a plurality of enzymes.

4. The low or 0 net carbohydrate dry blend of claim 1, wherein the at least one enzyme component is present in an amount of about 1.1% to about 12% by weight of the dry blend.

5. The low or 0 net carbohydrate dry blend of claim 1, further comprising fiber.

6. The low or 0 net carbohydrate dry blend of claim 5, wherein the fiber is *psyllium*, sugarcane, wheat, bamboo, flaxseed, oat, or combinations thereof.

7. The low or 0 net carbohydrate dry blend of claim 1, further comprising at least one non-gluten protein.

8. The low or 0 net carbohydrate dry blend of claim 7, wherein the at least one non-gluten protein is wheat protein, canola protein, pea protein, fava protein, or combinations thereof.

9. The low or 0 net carbohydrate dry blend of claim 1, further comprising protein isolate.

10. The low or 0 net carbohydrate dry blend of claim 9, wherein the protein isolate is fava bean protein isolate, pea protein isolate, mung bean protein isolate, or combinations thereof.

11. The low or 0 net carbohydrate dry blend of claim 1, further comprising a hydrocolloid.

12. The low or 0 net carbohydrate dry blend of claim 11, wherein the hydrocolloid is guar, flax, or a combination thereof.

13. The low or 0 net carbohydrate dry blend of claim 11, wherein the hydrocolloid comprises at least one gum.

14. The low or 0 net carbohydrate dry blend of claim 13, wherein the at least one gum is xanthan gum, guar gum, or a combination thereof.

15. A low or 0 net carbohydrate dough composition, comprising:
   i) the low or 0 net carbohydrate dry blend of claim 1;
   ii) at least one liquid ingredient;
   iii) salt; and
   iv) yeast.

16. The low or 0 net carbohydrate dough composition of claim 15, wherein the low or 0 net carbohydrate dry blend is present in an amount of about 25% to about 75% by weight of the dough composition.

17. The low or 0 net carbohydrate dough composition of claim 15, wherein the at least one liquid ingredient comprises water.

18. The low or 0 net carbohydrate dough composition of claim 17, wherein the water is present in an amount of about 39% to about 44% by weight of the dough composition.

19. The low or 0 net carbohydrate dough composition of claim 15, wherein the at least one liquid ingredient comprises oil.

20. The low or 0 net carbohydrate dough composition of claim 19, wherein the oil is present in an amount of about 2.0% to about 8.0%, by weight of the dough composition.

21. The low or 0 net carbohydrate dough composition of claim 19, wherein the oil is canola oil, soybean oil, olive oil, safflower oil, vegetable oil or combinations thereof.

22. The low or 0 net carbohydrate dough composition of claim 15, wherein the at least one liquid ingredient comprises vinegar.

23. The low or 0 net carbohydrate dough composition of claim 22, wherein the vinegar is present in an amount of about 0.5% to about 3.0% by weight of the dough composition.

24. The low or 0 net carbohydrate dough composition of claim 22, wherein the vinegar is white vinegar or apple cider vinegar.

25. The low or 0 net carbohydrate dough composition of claim 15, wherein the salt is present in an amount of about 0.5% to about 2.5%, by weight of the dough composition.

26. The low or 0 net carbohydrate dough composition of claim 15, wherein the yeast is present in an amount of about 0.7% to about 5.5% by weight of the dough composition.

27. The low or 0 net carbohydrate dough composition of claim 15, wherein the yeast is *Saccharomyces cerevisiae*.

* * * * *